United States Patent [19]

Ward et al.

[11] 3,929,535

[45] Dec. 30, 1975

[54] COLOR REVERSIBLE, MIRROR SURFACE GLASSY MATERIALS FROM PLUMBITE-TREATED CELLULOSICS

[75] Inventors: Truman L. Ward; Ruth R. Benerito, both of New Orleans, La.

[73] Assignee: The United States of America as represented by the Secretary of Agriculture, Washington, D.C.

[22] Filed: Aug. 22, 1974

[21] Appl. No.: 499,693

[52] U.S. Cl.: ............... 156/82; 156/306; 427/165; 427/224; 427/382
[51] Int. Cl.². B29C 25/00; B32B 31/12; B44D 5/00
[58] Field of Search ............ 156/89, 306, 76, 2, 24, 156/82; 117/35; 65/17, 31, 60, 36, 65; 350/288, 320; 427/165, 224, 225, 382

[56] References Cited
UNITED STATES PATENTS

| | | | |
|---|---|---|---|
| 123,247 | 1/1872 | Durand | 117/35 S |
| 2,190,210 | 2/1940 | Kaber | 156/89 X |
| 2,595,800 | 5/1952 | McGraw et al. | 117/35 S |

*Primary Examiner*—William A. Powell
*Attorney, Agent, or Firm*—M. Howard Silverstein; Max D. Hensley

[57] ABSTRACT

Colored glasslike materials have been produced from an uncolored transparent or translucent glassy intermediate which was made by heating plumbite-treated cellulosics in a limited oxygen atmosphere while in contact with a glass or ceramic surface. The uncolored intermediate can be caused to become either gold, silver or purplish black and mirrorlike by exposing it to the direct flame of a bunsen-type burner. The color may be removed by reheating the glassy material in an oven or by heating the back side with a bunsen-type burner when the glassy material is bound to a glass or ceramic holder. The color formation color removal may be repeated.

3 Claims, No Drawings

COLOR REVERSIBLE, MIRROR SURFACE GLASSY MATERIALS FROM PLUMBITE-TREATED CELLULOSICS

This application is related to applications Ser. Nos. 499,688 and 499,689, filed of even date.

Ser. No. 499,688 discloses heating 8% to 37% lead content, plumbite-treated cellulosics at about 600° C. to 700° C. for about 1 hour while maintaining contact between the cellulosic and a glass or ceramic surface on one side and alumimum foil on the other. A glasslike material was formed on the glass or ceramic which will conduct electricity.

Ser. No. 499,689 discloses heating plumbite-treated cellulosics having greater than about 8% lead-content at about 600° C. for about 1 hour while the cellulosic is sandwiched between two glass and/or ceramic surfaces or is contacting a single surface. A glasslike bond between the cellulosic residue and the surface(s) was formed. Glass surfaces are etched by the same technique when greater than about 25% lead content is employed.

This invention relates to a colored glasslike substance, or groups of substances, produced by heating with a direct flame from a bunsen-type burner a product resulting from heating a plumbite-treated cellulosic in a limited oxygen atmosphere while in contact with a glass or ceramic surface. Metallic colored flakes, adherences, surfaces and artistic designs can be achieved by the processes of the present invention.

PRIOR ART

The prior art teaches that elemental metallic mirror films may be formed on glass.

OBJECTS OF THE INVENTION

One object of this invention is to provide a process for adding metallic gold, silver, or purplish black color to the glassy materials produced by heating plumbite-treated cellulosics in a limited oxygen atmosphere while in contact with a glass or ceramic.

A second object of this invention is to provide a reversible process for adding and removing metallic gold, silver, or purplish black color to the glassy materials produced by heating plumbite-treated cellulosics in a limited oxygen atmosphere.

A third object of this invention is to provide a process for producing a mirrorlike film on the front surface of a glass or ceramic.

A fourth object is to provide a process for producing a one-way mirror effect on clear glass.

We have now discovered that the glassy material can be caused to become shiny metallic gold, silver, or dark purple by exposure to the firect flame from a bunsen-type burner with a temperature of 1,000° to 1,500°C. The length of exposure determined the color with the exposure varying from about 1 minute to about 5 minutes. The transparent or translucent material first became gold colored upon application of the torch. Continued application of the flame caused the film to become silver and then purple. The surfaces, as analyzed by photoelectron emission spectroscopy (ESCA), were not pure metal and contained substantial silica, carbon and oxygen, and were not electrically conductive as indicated by resistance measurements. Each color acted as a one-way mirror, i.e., it reflected light back toward the source and yet objects were clearly discernible if viewed through the film from the rear of the film.

Further investigation also established that the color could be removed and the material returned to the original transparent or translucent state by applying heat to the backside of the film with a burner (only if the film is adhered to a backing glass) or by heating in an oven to about 600°C. to 700°C. until the color disappears, which usually occurred in about 30 minutes.

It was furthermore found that the cycle of producing and removing the color could be repeated on the same sample over and over at least six times with no apparent change in the nature of the material or loss in weight.

GENERAL ASPECTS OF THE PRESENT INVENTION

The present invention consists of a process for producing gold, silver or purple mirrorlike surfaces on glassy sheets or adherances which sheets or adherances were made by heating plumbite-treated sheet cellulosics while the cellulosics were in flat surface contact with a silica glass or ceramic. By the process of this invention the glassy material is caused to become gold, silver or purple and mirrorlike by the application of the direct flame from a gas burner such as a bunsen burner to the surface. The lesser length of exposure of the flame produces the gold color while the longest exposure produces purple with silver intermediate. The flame may be moved over the surface to produce a uniform color or it may be focused longer on one area to produce a multicolored effect. The color change is effected in a matter of a few minutes with the exact time of exposure depending on temperature of the burner flame and distance from the surface to be colored. By the process of this invention the color may be removed and the glassy material restored to the original colorless transparent or translucent state by reheating the glassy material in an oven at 600°C. to 700°C. until the color disappears or by applying heat from the bunsen-type burner to the backside of the glass or ceramic holder (when the glassy material is adhered to a glass or cermaic). By the process of this invention the color may be added, removed or varied.

A specific application of the process would involve the coloration of a glassy material made by:
1. Soaking a piece of cotton fabric in sodium plumbite solution made by reacting excess lead monoxide with 12% aqueous sodium hydroxide. The lead content of the cotton fabric will vary with length of time in the plumbite solution. A lead content of 15% is a desirable level. The plumbite-treated fabric is washed well with water to remove excess plumbite and dried.
2. The dry plumbite-treated cotton fabric is placed against a high silicon content glass or ceramic in an oven below 200°C. and heated to approximately 600° to 800°C. and maintained there approximately 1 hour to produce the colorless transparent or translucent glassy material which is ready for coloration by the process of this invention.

The material prepared in the above manner is reheated over the surface of one side by playing the flame of a bunsen-type gas burner over the surface. The color of the heated area will change color becoming gold, silver or purple depending on the length of time the flame is applied to the surface. About 1 minute will produce a gold color while about 5 minutes will produce a purple color. Silver color is produced by an intermediate length of exposure to the flame. The color is not produced by heating in an oven, no matter for how long, even if the same temperature is achieved. The environment of the gas flame is a necessary condition of the process of this invention. The color is shiny and like a mirror when viewed from the side to which the flame was applied. If viewed from the opposite side of the film (opposite to where the flame was applied) the film acts as the rear of a one-way mirror. If looking through the film from the rear toward an area of higher illumination, objects, etc. are clearly seen. Although the color looks like shiny metal, it is not electrically conductive.

To remove the color, the film is heated to about 600°C. to 700°C. in an oven until the color is gone. This takes about a half-hour after the sample reaches the oven temperature. When the film is adhered to a glass or ceramic holder, the color may also be removed by heating the side of the holder that is away from the film with the same bunsen-type gas burner that was used to impart the color.

The color is put back and removed at will by use of the process described in this specific example.

We claim:

1. A process for imparting to silica glass or ceramics reversible surface colorations which are visable from the one side in a mirror-like finish, when viewed from the same side as the light source, and are semi-transparent or clear when viewed from the opposite side, the said process comprising:
   a. contacting a plumbite-treated cellulosic sheet flatly against a silica glass or ceramic surface, the said cellulosic sheet containing about from 8% to 15% lead,
   b. heating the contacted material in a closed oven, or other limited oxygen environment, at a temperature of below 200°C. and elevating said temperature to about from 600° to 800°C. and maintaining the elevated temperature for a period of about 60 minutes to obtain a chemically bound unit of assembled components with hard surfaces,
   c. cooling the said unit slowly to avoid fractionation of the component parts, and
   d. reheating the plumbite-treated side of the said unit with a gas-air flame of about from 1,000° to 1,500°C. to obtain colorations in the gold, silver, and purple range upon heating for periods of about from 1 to 5 minutes, the lesser quantities of heat yielding the golden tones, the medium quantities the silver tones, and the higher quantities the purplish tones.

2. A process for removing the coloration imparted by the process of claim 1 comprising heating the colored material in a closed oven at temperatures of about from 600° to 700°C., for about 30 minutes.

3. A process for removing the coloration imparted by the process of claim 1 comprising applying the said gas-air flame directly to the side of the assembled components opposite the plumbite-cellulosic film side, and maintaining the heating for a period of time long enough to cause the coloration removal.

* * * * *